United States Patent
Sundararajan et al.

(10) Patent No.: US 10,336,275 B2
(45) Date of Patent: Jul. 2, 2019

(54) VEHICLE PARTITION

(71) Applicant: Ford Global Technologies, LLC, Dearborn, MI (US)

(72) Inventors: Srinivasan Sundararajan, Ann Arbor, MI (US); Saeed David Barbat, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 89 days.

(21) Appl. No.: 15/618,502

(22) Filed: Jun. 9, 2017

(65) Prior Publication Data

US 2018/0354444 A1 Dec. 13, 2018

(51) Int. Cl.
*B60R 21/02* (2006.01)
*B60R 21/20* (2011.01)

(52) U.S. Cl.
CPC ............ *B60R 21/026* (2013.01); *B60R 21/20* (2013.01)

(58) Field of Classification Search
CPC ................. B60R 21/026; B60R 21/20; B60R 2021/23153; B60R 2021/23161
See application file for complete search history.

(56) References Cited

U.S. PATENT DOCUMENTS

| | | | |
|---|---|---|---|
| 4,267,895 A | 5/1981 | Eggert, Jr. | |
| 5,222,761 A * | 6/1993 | Kaji | ...................... B60R 21/017 280/730.2 |
| 6,004,084 A | 12/1999 | Moker | |
| 6,142,521 A * | 11/2000 | Shephard | ................. B60R 19/00 280/728.1 |
| 6,286,882 B1 | 9/2001 | Rastetter | |
| 6,991,060 B2 * | 1/2006 | Chernoff | ................... B60N 2/01 180/326 |
| 7,726,688 B2 | 6/2010 | Setina | |
| 8,177,275 B2 | 5/2012 | Willis et al. | |
| 8,393,642 B2 | 3/2013 | Nakaya et al. | |
| 8,646,807 B2 | 2/2014 | Suga et al. | |
| 9,446,731 B1 * | 9/2016 | West | ................... B60R 13/0262 |

(Continued)

FOREIGN PATENT DOCUMENTS

| | | | |
|---|---|---|---|
| FR | 2931421 A1 * | 11/2009 | ........... B60R 21/231 |
| GB | 2386351 A | 9/2003 | |

(Continued)

OTHER PUBLICATIONS

Ledain et al., Security device for e.g. roof assembly of motor vehicle, has rear lateral extensions deployed between rear of backrests of front seats and in front of rear bench seat, Nov. 27, 2009, EPO, FR 2 931 421A1, English Abstract (Year: 2009).*

(Continued)

Primary Examiner — James A English
(74) Attorney, Agent, or Firm — Frank A. MacKenzie; Bejin Bieneman PLC (57) ABSTRACT

A vehicle includes a floor having a front portion, a rear portion, and a middle portion between the front and rear portions. A partition is supported on the floor between the front and middle portions, extending in a cross-vehicle direction. An airbag housing supported by the partition has an airbag inflatable from the housing to an inflated position. In the inflated position, the airbag extends from the housing in a vehicle-rearward direction.

20 Claims, 7 Drawing Sheets

(56) References Cited

U.S. PATENT DOCUMENTS

| | | | | |
|---|---|---|---|---|
| 2009/0001695 A1* | 1/2009 | Suzuki | ............... | B60R 21/231 280/730.2 |
| 2009/0184501 A1* | 7/2009 | Hirotani | ............... | B60J 5/0451 280/730.2 |
| 2012/0200070 A1* | 8/2012 | Baccelli | ............... | B60R 21/20 280/730.2 |
| 2014/0027574 A1* | 1/2014 | Obadia | ............... | B60R 21/20 244/121 |
| 2016/0152163 A1* | 6/2016 | Strasdat | ............... | B60R 7/04 296/64 |
| 2018/0126941 A1* | 5/2018 | Faruque | ............... | B60R 21/207 |

FOREIGN PATENT DOCUMENTS

| | | |
|---|---|---|
| GB | 2533458 A | 6/2013 |
| NL | 1024182 C2 | 8/2003 |

OTHER PUBLICATIONS

Ledain et al., Security device for e.g. roof assembly of motor vehicle, has rear lateral extensions deployed between rear of backrests of front seats and in front of rear bench seat, Nov. 27, 2009, EPO, FR 2 931 421 A1, Machine Translation of Description (Year: 2009).*

Search Report from United Kingdom Intellectual Property Office dated Nov. 19, 2018 regarding Application No. GB1809438.3 (3 pages).

* cited by examiner

VEHICLE PARTITION

BACKGROUND

Vehicles, such as autonomous vehicles, are becoming more sophisticated. As the level of sophistication of vehicles continues to increase, the amount of passenger interaction required to drive the vehicles decreases. For example, fully autonomous vehicles can control all steering, braking, and throttle when driving. Partially autonomous vehicles can provide at least limited control over the steering, braking, and throttle. Autonomous and partially autonomous vehicles can thus make different seating configurations possible, allowing occupants to focus on non-driving-related tasks when riding in vehicles.

DETAILED DESCRIPTION

A vehicle includes a floor having a front portion, a rear portion, and a middle portion between the front and rear portions. A partition is supported on the floor between the front and middle portions extending in a cross-vehicle direction. The partition supports a first airbag housing having a first airbag inflatable to an inflated position. The first airbag extends in a vehicle-rearward direction in the inflated position.

The partition may extend from the floor in a generally perpendicular direction relative to the floor.

The front portion may be between an instrument panel and the partition. The front portion may be devoid of seats. At least a portion of the front portion of the floor may be recessed relative to the middle portion of the floor.

A retaining cover may be moveable between an open position and a closed position and may cover at least a portion of the front portion of the floor in the closed position.

The partition may support a second airbag housing having a second airbag inflatable to an inflated position. The second airbag housing may be spaced from the first airbag housing in the cross-vehicle direction.

A front seat may be disposed on the front portion of the floor. The front seat may be facing the vehicle-rearward direction. A first space on the front portion of the floor may extend between a first side of the front seat and a left end of the floor. A second space on the front portion of the floor may extend between a second side of the front seat and a right end of the floor.

At least one of the first and second spaces may be recessed relative to the middle portion of the floor.

First and second retaining covers may be moveable between an open position and a closed position. The first retaining cover may cover at least a portion of the first space in the closed position, and the second retaining may cover at least a portion of the second space in the closed position.

The partition may define an opening aligned with the front seat in the cross-vehicle direction.

In the inflated position, the first airbag may cover at least a portion of the opening.

The partition may support a second airbag housing having a second airbag inflatable to an inflated position. The first airbag housing supported by the partition may be on a first side of the opening and the second airbag housing supported by the partition supported by the partition on a second side of the opening.

The second airbag may cover at least a portion of the opening in the inflated position.

A first middle seat may be disposed on the middle portion of the floor. A second middle seat may also be disposed on the middle portion of the floor and spaced from the first middle seat.

A rear seat may be disposed on the rear portion of the floor.

The vehicle may include a vehicle body having a left side and a right side, the vehicle body having a first door on the left side and a second door on the right side. The first and second doors may be slidably mounted to the vehicle body.

With reference to the Figures, wherein like numerals indicate like parts throughout the several views, a vehicle 10 includes a floor 34 having a front portion 36, a rear portion 40, and a middle portion 38 between the front and rear portions 36, 40. A partition 50 is supported on the floor 34 between the front and middle portions 36, 38 and extends in a cross-vehicle direction. The partition 50 supports a first airbag housing 58 having a first airbag 60 inflatable to an inflated position. The first airbag 60 extends in a vehicle-rearward direction in the inflated position.

Figure 2A:
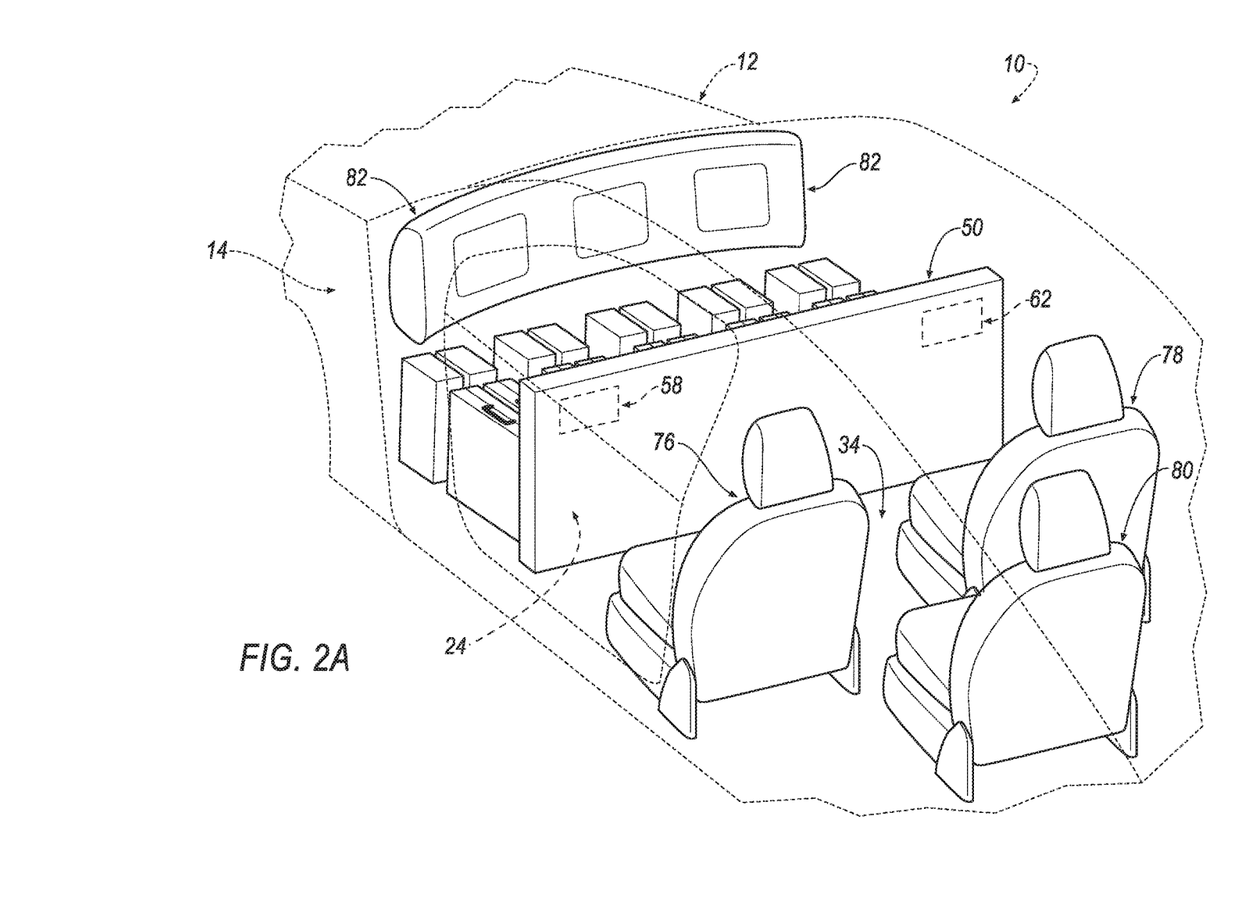
FIG. 2A is a perspective view of the vehicle including a partition, with a vehicle body in hidden line.

Multiple seating configurations are possible in vehicles, such as autonomous vehicles. In autonomous vehicles, for example, the front portion 36 of the floor 34 of the vehicle 10 can be devoid of seats, as shown in FIG. 2A. As such, the front portion 36 of the floor 34 can be utilized to store and transport cargo, such as luggage, etc., rather than for seats to accommodate a human driver and passengers.

Referring to FIGS. 2A-4B, the partition 50 is supported on the floor 34 between the front and middle portions 36, 38. The partition 50 extends in the cross-vehicle direction. The partition 50 can also extend in generally perpendicular direction relative to the floor 34.

The partition 50 can support airbag housings, such as the first airbag housing 58 and a second airbag housing 62. As shown in FIGS. 2A-4B, the first and second airbag housings 58, 62 are spaced from each other in a cross-vehicle direction. Each of the first and second airbag housings 58, 62 includes an airbag, a first airbag 60 and a second airbag 64, respectively, that is inflatable from an uninflated position to the inflated position. In the inflated position, at least one of the first and second airbags 60, 64 extends in the vehicle-rearward direction.

In addition to supporting airbag housings, the partition 50 can also assist in controlling displacement of cargo from the front portion 36 during, e.g., an impact event. Thus, the partition 50 can assist in enhancing passenger protection.

The vehicle 10 may be of any suitable type. For example, the vehicle 10 can be any type of automobile, such as a car, a truck, a crossover vehicle, a van, a minivan, etc. Moreover, the vehicle 10 may be powered in a variety of known ways, such as with an electric motor, an internal combustion engine, and/or combinations thereof.

The vehicle 10 may be an autonomous vehicle. Autonomous vehicles use a variety of sensors and computing devices to operate the vehicle 10 with various levels of input from a human driver. The computing device(s) of the vehicle 10 may operate the vehicle 10 in an autonomous mode, a semi-autonomous mode, or a non-autonomous mode. An autonomous mode is defined as one in which each of a propulsion, braking, and steering system of the vehicle 10 are controlled by the computer; in a semi-autonomous mode the computing device controls one or two propulsion, braking, and steering systems of the vehicle 10; in a non-autonomous mode, a human operator controls the propulsion, braking, and steering systems of the vehicle 10.

The vehicle 10 includes a vehicle body 12. The vehicle body 12 can be supported by a frame (not shown). The vehicle body 12 and the frame can be a unibody construction. In the unibody construction, the vehicle body 12, e.g., rocker panels, etc., serves as the frame, and the vehicle body 12 (including the rocker panels, pillars, roof rails, etc.) is unitary, i.e., a continuous one-piece unit.

In another approach, the vehicle body 12 can have a body-on-frame construction (also referred to as a cab-on-frame construction). In other words, the vehicle body 12 and the frame are separate components, i.e., modular, and the vehicle body 12 is supported on and fixed to the frame. The vehicle body 12 and the frame can have any suitable construction. For example, the vehicle body 12 and/or the frame may be formed of materials such as steel, aluminum, carbon fiber, etc.

The vehicle body 12 includes exterior surfaces, such as a hood, windows, lids and/or hatches. Exterior surfaces of the vehicle body 12 can present a Class-A, substantially defect-free, finely-finished surface appearance. The exterior surfaces can be formed from any suitable material, such as painted steel, aluminum and plastic, etc.

As shown in FIGS. 3A-4B, the vehicle body 12 has a left side 14 and a right side 16. The left side 14 of the vehicle body 12 can include a first door 24. The right side 16 of the vehicle body 12 can include a second door 26. The first and second doors 24, 26 can be configured to permit passenger ingress and egress, loading and unloading of cargo, etc.

Figure 1A:
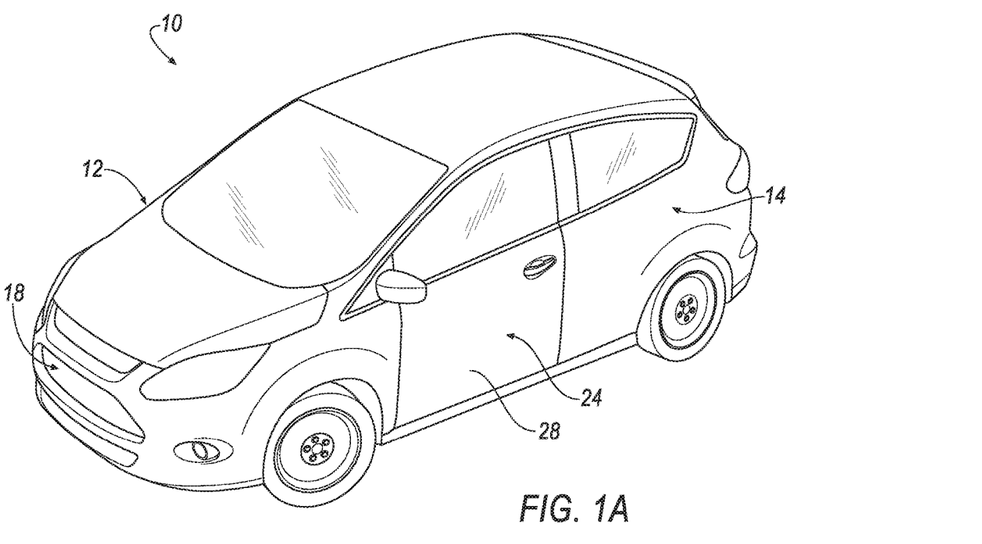
FIG. 1A is a perspective view of a vehicle.
Figure 1B:
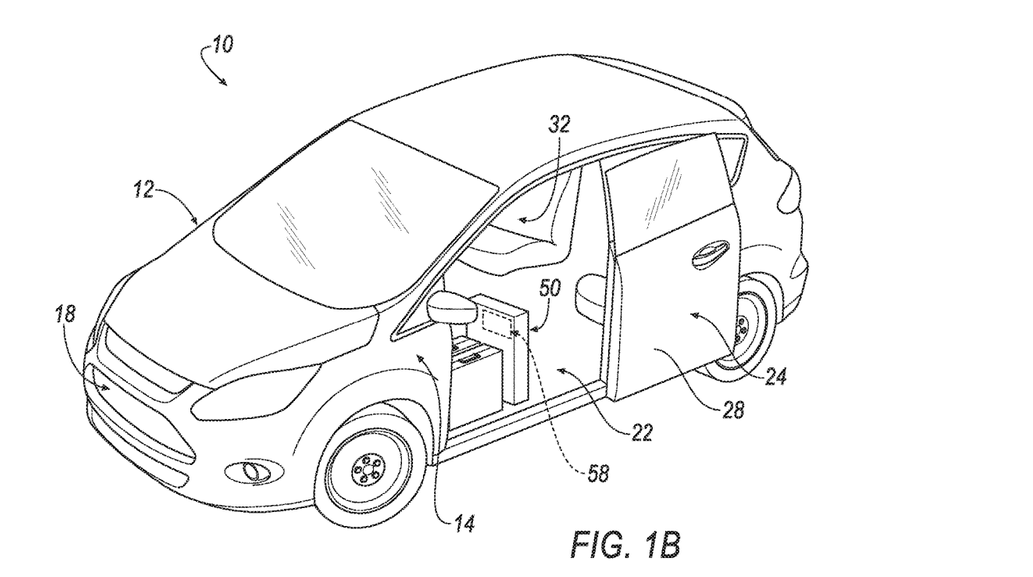
FIG. 1B is a perspective view of the vehicle with a first door on a left side of the vehicle shown in an open position.

The first door 24 and/or the second door 26 can be slidably mounted in openings 22 in the vehicle body 12. As illustrated in FIG. 1B, the openings 22 can be located on the vehicle body 12 such that when the first door 24 and/or the second door 26 are in an open position, cargo can be placed in/retrieved from a vehicle-forward position relative to the partition 50, and passengers can enter/exit the vehicle 10 in the vehicle-rearward direction relative to the partition 50.

Alternatively, the first door 24 and/or the second door 26 can be pivotally mounted to the vehicle body 12.

Each of the first and second doors 24, 26 can include a door outer 28, a door inner (not shown), and a trim panel 30. The door outer 28 may be fixed to the door inner by flanging, welding, or in any other suitable way. The door outer 28 and the door inner may be formed of metal (e.g., aluminum, steel, etc.), composite material (e.g., fiber reinforced thermoplastic, sheet molding compound (SMC), etc., and/or other suitable materials. The door outer 28 may have a class-A exterior surface facing exteriorly, i.e., the exterior surface, specifically manufactured to have a high-quality, finished aesthetic appearance free of blemishes.

The trim panel 30 is fixed to the door inner in any suitable way, e.g., threaded fasteners, clips, push-pins, Christmas tree fasteners, etc. The trim panel 30 may be formed of plastic, foam, leather, vinyl, etc. and combinations thereof. The trim panel 30 may have a class-A surface facing an interior space 32 of the vehicle 10, i.e., a surface specifically manufactured to have a high-quality, finished aesthetic appearance free of blemishes.

As shown in FIGS. 3A-4B, the floor 34 of the vehicle 10 includes the front portion 36, the rear portion 40, and the middle portion 38 between the front and rear portions 36, 40. The floor 34 can have a front end 42, a right end 44, a back end 46, and a left end 48. As discussed above and shown in FIGS. 2A-4B, the partition 50 is supported between the front and middle portions 36, 38 of the floor 34.

The partition 50 can be supported by the floor 34 in various suitable way. For example, the partition 50 can be attached to the floor 34 with fasteners, such as bolts, or in any other suitable manner, e.g., welding, adhesives, combinations thereof, etc. Alternatively, the partition 50 can be integral with the floor 34, i.e., the partition 50 and the floor 34 can be a single, monolithic part.

As illustrated in the Figures, the partition 50 can extend in the cross-vehicle direction. For example, the partition 50 can extend between the left end 48 of the floor 34 and the right end 44 of the floor 34. The partition 50 can also include an opening 54, as shown in FIGS. 2B-4B. The opening 54 can be aligned in the cross-vehicle direction with a front seat 66 disposed on the front portion 36 of the floor 34, as discussed further below.

Figure 2B:
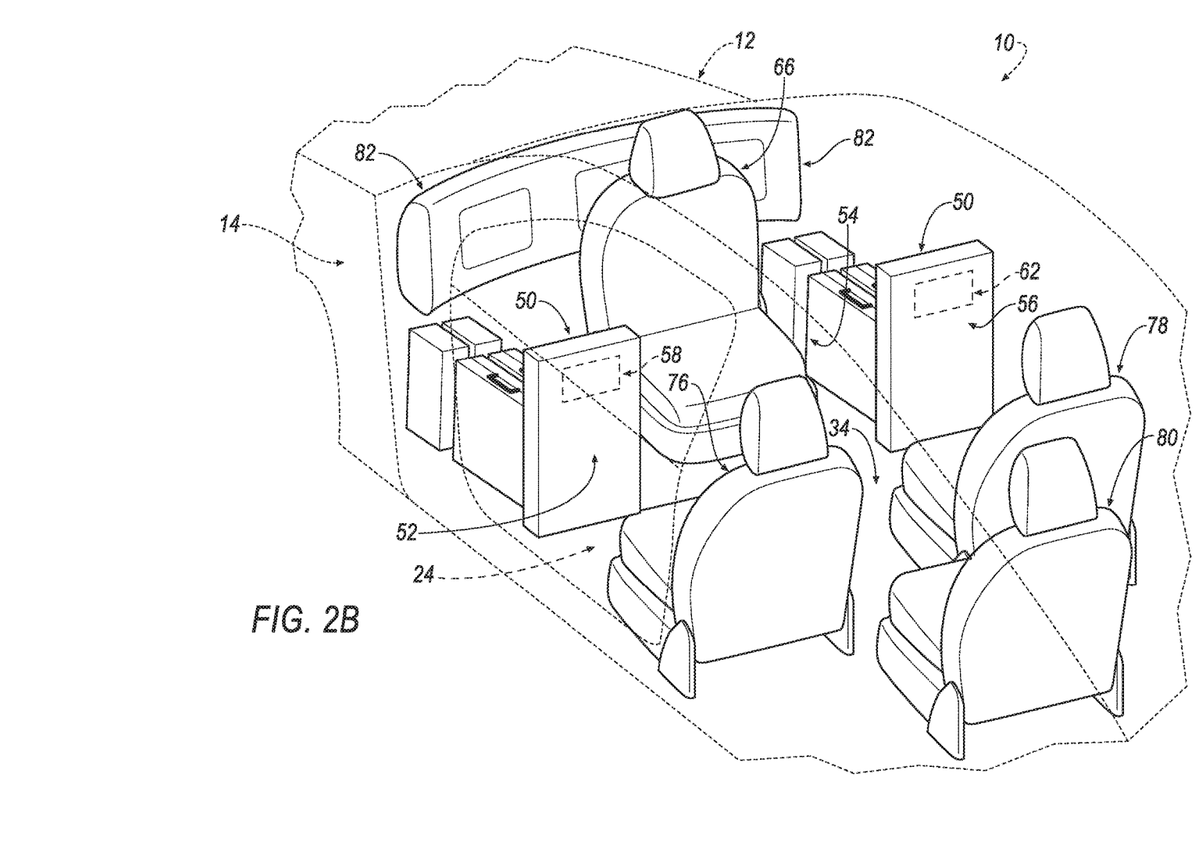
FIG. 2B is a perspective view of a vehicle including a partition having an opening, with a vehicle body in hidden line.

The partition 50 can extend in a generally perpendicular direction relative to the floor 34. As shown in FIGS. 2A-B, for example, the partition 50 can extend to a height above the floor 34 approximate a beltline of the vehicle 10, e.g., 36 inches. The partition 50 can be formed of any suitable material, e.g., metal (e.g., aluminum, steel, etc.), composite materials (e.g., fiber reinforced thermoplastic, sheet molding compound (SMC), etc.

Trim panels (not shown) can be attached to a surface of the partition 50. For example, trim panels can be attached to the partition 50 with, e.g., threaded fasteners, clips, push-pins, Christmas tree fasteners, etc. As discussed above, the trim panels may be formed of plastic, foam, leather, vinyl, etc., and combinations thereof. The trim panels may have a class-A surface, i.e., a surface specifically manufactured to have a high-quality, finished aesthetic appearance free of blemishes facing the interior space 32 of the vehicle 10.

While FIGS. 2A-4B illustrate a single partition 50, other partitions can be supported by the floor 34 in addition to (or instead of) the partition 50. For example, a partition (not shown) can be supported between the middle and rear portions 38, 40 of the floor 34. The partition could also extend in the cross-vehicle direction. Additionally and alternatively, another partition (not shown) can be supported on a centerline C of the vehicle 10 extending between a front 18 of the vehicle 10 and a rear 20 of the vehicle 10. The partition could extend in a vehicle-forward to the vehicle-rearward direction.

While FIGS. 2A-4B show one partition 50 supported between the front and middle portions 36, 38 of the floor 34, it should be appreciated that this is for illustrative purposes only. The vehicle 10 can include other partition in other locations.

As discussed above, the partition 50 can support airbag housings, such as the first airbag housing 58 and the second airbag housing 62. Each of the first and second airbag housings 58, 62 includes an airbag, the first airbag 60 and the second airbag 64, respectively, that is inflatable from the uninflated position to the inflated position. In the inflated position, at least one of the first and second airbags 60, 64 extends in the vehicle-rearward direction.

The partition 50 can support the one or more airbag housings 58, 62 and their associated airbags 60, 64 at locations to assist in passenger protection. For example, as discussed below and shown in FIGS. 2A-4B, one or more middle seats, e.g., a first middle seat 76 and/or a second middle seat 78, can be disposed on the middle portion 38 of the floor 34, i.e., in the vehicle-rearward direction relative to the partition 50.

The one or more airbag housings 58, 62 can be supported by the partition 50 at locations such that the one or more airbag housings 58, 62 are aligned in the cross-vehicle direction with the one or more middle seats. Thus, in an impact event, each airbag 60, 64 associated with each of the one or more airbag housings 58, 62 can inflate to the inflated position to assist in adsorbing impact energy from occupants in the one or more middle seats.

In addition, as discussed below, the front seat 66 can be disposed on the front portion 36 of the floor 34. As shown in FIGS. 2B-4B, the partition 50 can include an opening 54 aligned with the front seat 66 in the cross-vehicle direction.

The first airbag housing 58 can be supported by the partition 50 on a first side 52 of the opening 54. The second airbag housing 62 can be spaced from the first airbag housing 58 in the cross-vehicle direction, and supported by the partition 50 on a second side 56 of the opening 54.

In this approach, the first airbag housing 58 and the second airbag housing 62 can be supported by the partition 50 at locations such that at least one of the first and second airbags 60, 64 inflate to the inflated position in the vehicle-rearward direction. The first airbag 60 and/or the second airbag 64 can be further configured, e.g., using tethers, etc., to cover at least a portion of the opening 54 in the inflated position. Thus, in a rear impact event, the first airbag 60 and/or the second airbag 64 can assist in absorbing impact energy from an occupant in the front seat 66 disposed on the front portion 36 of the floor 34.

Figure 4A:
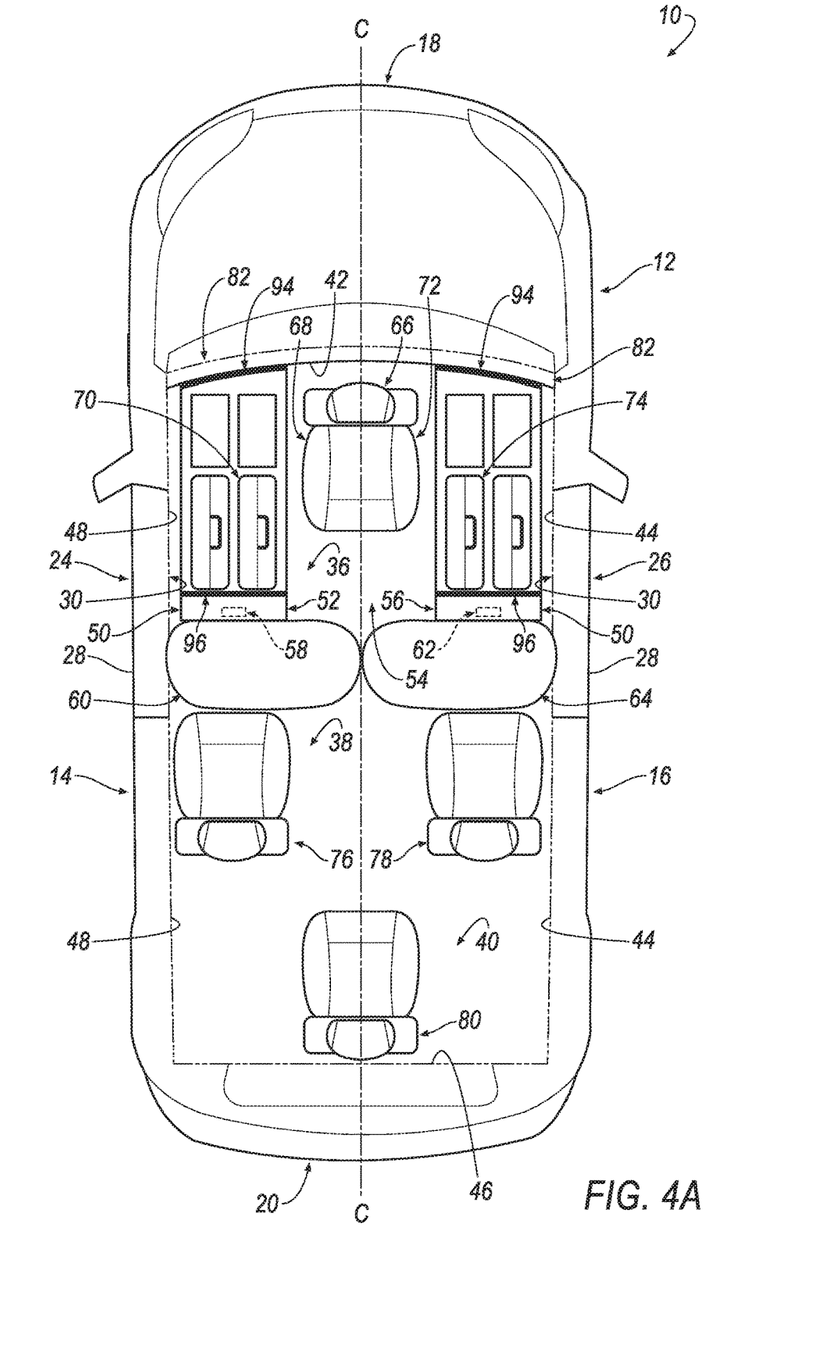
FIG. 4A is a cut-away top view of the vehicle with the partition shown in FIG. 2B, and two airbags in an inflated position, and first and second retaining covers in open positions.
Figure 4B:
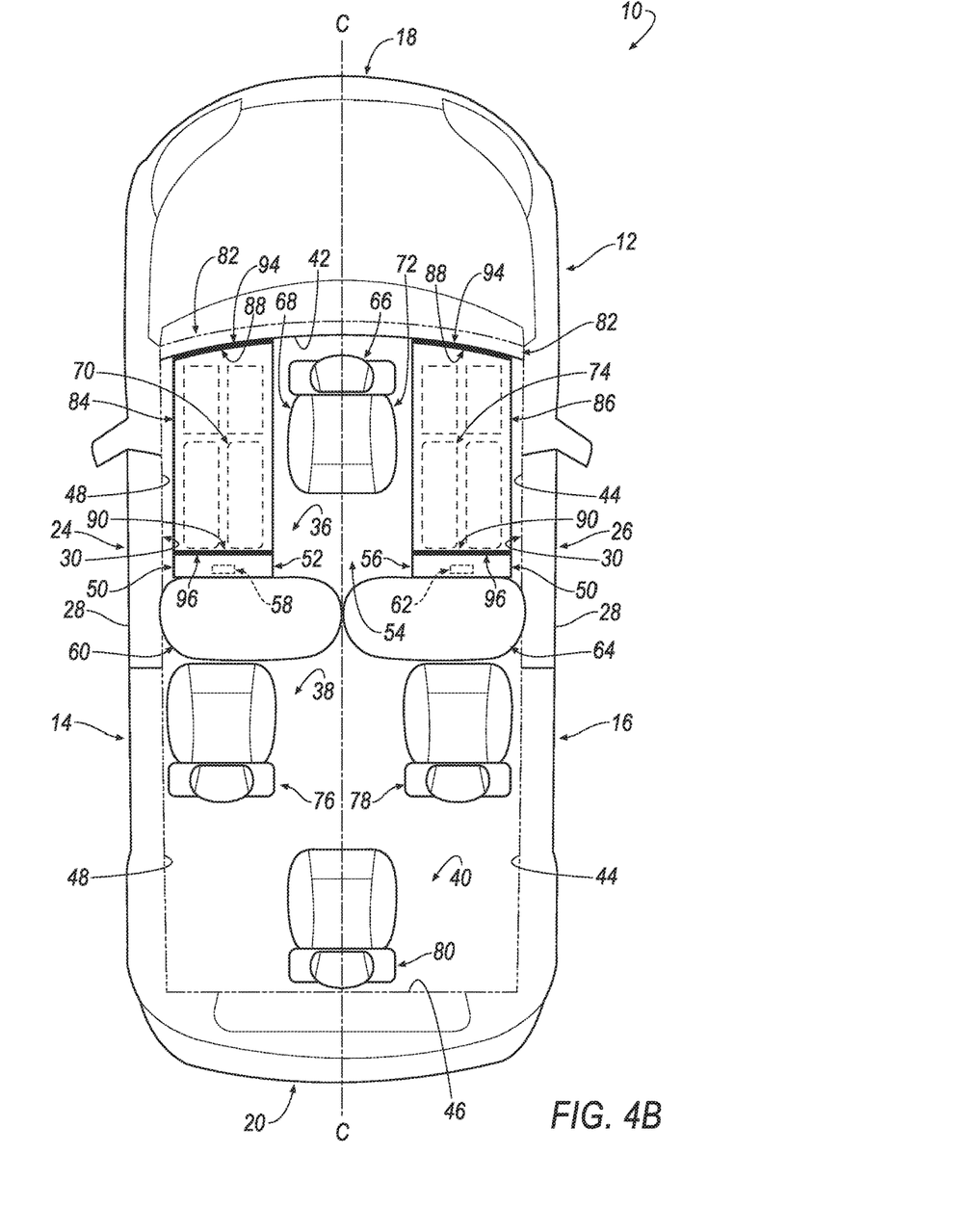
FIG. 4B is a cut-away top view of the vehicle with the partition shown in FIG. 2B, two airbags in the inflated position, and first and second retaining covers in closed positions.

As shown in FIGS. 4A-B, the first and second airbag housings 58, 60 can support the first and second airbags 60, 64 in the inflated position. The first and second airbag housings 58, 60 can also provide a reaction surface for the first and second airbags 60, 64 when the first and second airbags 60, 64 inflate to the inflated position.

The first and second airbag housings 58, 60 can be formed of any suitable material and construction, e.g., a rigid polymer, a metal, a composite, or a combination of rigid materials. When in the uninflated position, the first and second airbags 60, 64 can be, e.g., rolled and/or folded to fit within the first and second airbag housings 58, 60, respectively.

The first and second airbag housings 58, 60 can further include an inflator (not shown). The inflator may inflate the airbags with an inflatable medium, such as a gas, upon receiving a signal from, e.g., a vehicle controller. The inflator may be, for example, a pyrotechnic inflator that uses a chemical reaction to drive inflation medium to the airbag. The inflator may be of any suitable type, for example, a cold-gas inflator.

The first and second airbags 60, 64 can be formed of any suitable airbag material, such as a woven polymer. For example, the first and second airbags 60, 64 may be formed of woven nylon yarn, e.g., nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

As discussed above, the floor 34 of the vehicle 10 includes the front portion 36, the rear portion 40, and the middle portion 38 between the front and rear portions 36, 40, as shown in FIGS. 3A-4B, with the partition 50 supported between the front and middle portions 36, 38.

As shown in FIGS. 2A-4B, the front portion 36 of the floor 34 can be between an instrument panel 82 and the partition 50. At least a portion of the front portion 36 of the floor 34 can be recessed relative to the middle portion 38 of the floor 34, as shown in FIGS. 3A and 4A.

The front portion 36 can be devoid of seats, as shown in FIG. 2A, and cargo can be stored and transported in the front portion 36, e.g., from the instrument panel 82 to the partition 50, and from the left end 48 to the right end 44 of the floor 34.

Alternatively, the front seat 66 can be disposed on the front portion 36 of the floor 34. As shown in FIGS. 2B-4B, for example, the front seat 66 can be disposed on the centerline C of the vehicle 10.

Figure 3A:
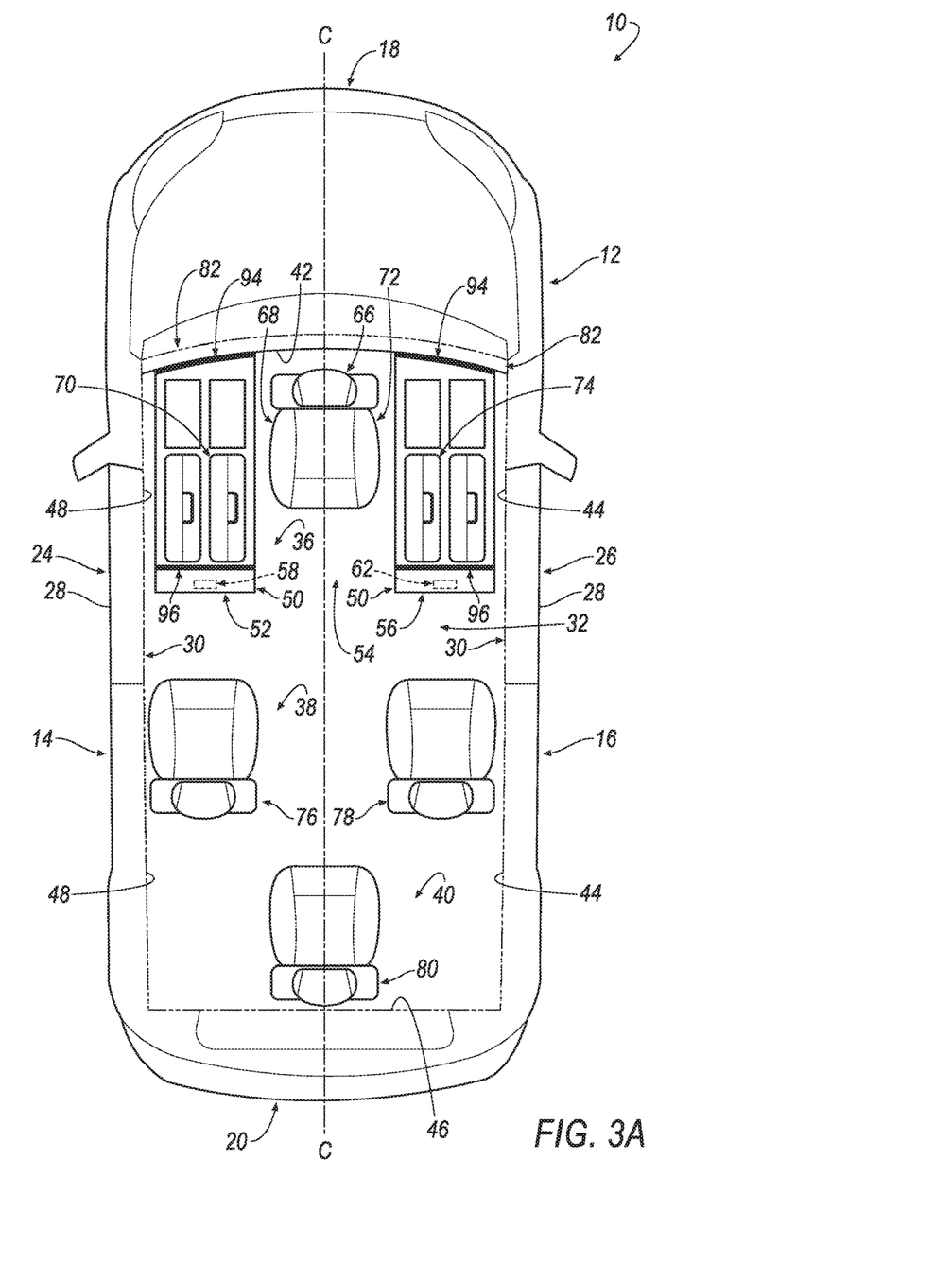
FIG. 3A is a cut-away top view of the vehicle with the partition shown in FIG. 2B, the partition supporting two airbag housings shown in hidden line, and first and second retaining covers in open positions.

In this approach, the front portion 36 of the floor 34 can include a first space 70 between a first side 68 of the front seat 66 and the left end 48 of the floor 34. The front portion 36 of the floor 34 can also include a second space 74 between a second side 72 of the front seat 66 and the right end 44 of the floor 34. As shown in FIGS. 3A and 4A, the first and/or second spaces 70, 74 can be recessed relative to the middle portion 38 of the floor 34, and used to store and transport cargo rather than for seats.

In other approaches, the front seat 66 can be located proximate the left end 48 of the floor 34, or proximate the right end 44 of the floor 34. If the front seat 66 is proximate the left end 48 of the floor 34, a space between the second side 72 of the front seat 66 and the right end 44 of the floor 34 can be used to store and transport cargo. If the front seat 66 is proximate to the right end 44 of the floor 34, a space between the first side 68 of the front seat 66 and the left end 48 of the floor 34 can be used to store and transport cargo.

While FIGS. 2B-4B illustrate the front seat 66 facing the vehicle-rearward direction, i.e., in which an occupant of the front seat 66 would be facing in a direction toward the rear 20 of the vehicle 10, the front seat 66 could also be oriented in, e.g., a vehicle-forward direction. That is, an occupant of the front seat 66 would be facing in a direction toward the front 18 of the vehicle 10.

The front seat 66 can include a seat bottom and a seatback. A base (not shown) can support the seat bottom of the seat on the front portion 36 of the floor 34. The base can be configured to maintain the front seat 66 in a fixed position, e.g., facing the vehicle-forward direction or facing the vehicle-rearward direction.

Alternatively, the base and the seat bottom can be slidably connected, e.g., with slidable rails (not shown). In this way, the front seat 66 can slidably move in a vehicle fore-aft direction, i.e., between a rearward position and a forward position on the front portion 36 of the floor 34.

The base and the seat bottom can be further configured to allow the front seat 66 to rotate relative to the floor 34. For example, the seat bottom can be rotatably attached to the base. When rotated, the base can be configured to allow the front seat 66 to be fixed at any location throughout a rotation relative to an initial location, e.g., at 45 degrees relative to the initial location, etc.

The front portion 36 can include retaining covers, e.g., a first retaining 84 cover and/or a second retaining cover 86. The retaining covers can be moveable between an open position and a closed position. In the closed position, the retaining covers can cover at least a portion of the front portion 36 of the floor 34, including covering cargo supported on the front portion 36 of the floor 34.

When the front portion 36 is devoid of seats, the front portion 36 can include a single retaining cover. The retaining cover can be sized to cover the front portion 36 of the floor 34, or a portion of the front portion 36.

For example, the retaining cover can have a length to cover an area between the left end 48 of the front portion 36 of the floor 34 and the right end 44. The retaining cover can extend from the left end 48 to the right end 44 of the front portion 36 of the floor 34, e.g., 8 feet. Alternatively, the retaining cover can have a length less than, e.g., 8 feet, to cover a smaller area between the right and left ends 44, 48 of the floor 34.

The retaining cover can also have a width to cover an area between the instrument panel and the partition 50. For example, the retaining cover can have a width that extends a distance from the instrument panel to the partition 50, e.g., 4 feet. Alternatively, the retaining cover can have a width less than, e.g., 4 feet, to cover a smaller area between the instrument panel and the partition 50.

The front portion 36 can also include one or more retaining covers when, e.g., a front seat 66 is disposed on the front portion 36 of the floor 34. For example, as shown in FIGS. 3A-4B, the front portion 36 includes a first retaining cover 84 and a second retaining cover 86.

As discussed above, when the front seat 66 is disposed on the front portion 36 of the floor 34 and on the centerline C of the vehicle 10, the front portion 36 can include a first space 70 between the first side 68 of the front seat 66 and the left end 48 of the floor 34, and a second space 74 between the second side 72 of the front seat 66 and the right end 44 of the floor 34.

Figure 3B:
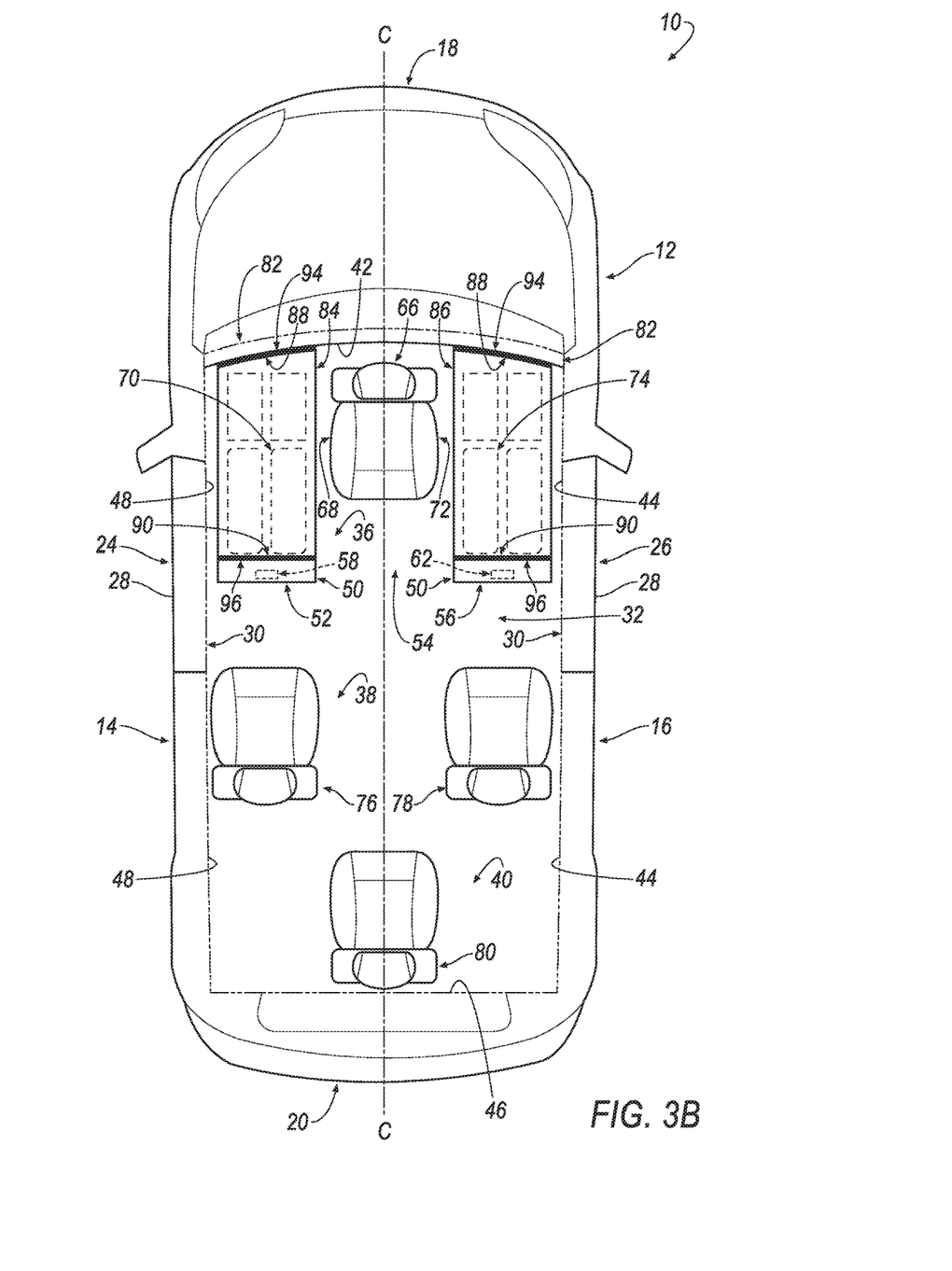
FIG. 3B is a cut-away top view of the vehicle with the partition shown in FIG. 2B, and first and second retaining covers in closed positions.

As shown in FIGS. 3B and 4B, the first retaining cover 84 can be sized to cover the first space 70, including cargo in the first space 70. The second retaining cover 86 can be sized to cover the second space 74, including cargo in the second space 74.

The retaining covers, such as the first and second retaining covers 84, 86, can include retaining cover assemblies 94. The retaining cover assemblies 94 can include a rotating mechanism, e.g., a shaft, to which a first end 88 of a retaining cover can attach. The retaining cover assemblies 94 can be located proximate the instrument panel 82, as shown in FIGS. 3A-4B. Alternatively, the retaining cover assemblies 94 can be located proximate the partition 50, or any other suitable location.

In the open position, the retaining covers, such as the first and second retaining covers 84, 86, can be, e.g., rolled and/or folded up in the retaining cover assemblies 92. The retaining cover assemblies 94 can be configured to automatically retract the retaining covers, such as the first and second retaining covers 84, 86, to the open position from the closed position, and from an intermediate position between the closed and open positions.

The retaining cover assemblies 94 can be further configured to automatically extend the retaining covers, such as the first and second retaining covers 84, 86, from the open position to the closed position, and to the closed position from an intermediate position between the open and closed positions. In this way, cargo can be readily loaded onto and unloaded from the front portion 36 of the floor 34 when the retaining covers, such as the first and second retaining covers 84, 86, are in the open position, as shown in FIGS. 3A-4A.

The retaining covers, such as the first and second retaining covers 84, 86, can also include an abutment end 90. The abutment end 90 can include a connector (not shown), e.g., a hook, a ball, a hook portion or a loop portion of a hook and loop fastener, a magnet, an electromagnet, etc., to engage a corresponding connector 96 when the retaining covers, such as the first and second retaining covers 84, 86, are in the closed position. For example, if a retaining cover assembly 94 is located proximate the instrument panel 82, as shown in FIGS. 3A-4B, the partition 50 can include the corresponding connector 96, e.g., an eye, a socket, etc. In this way, the corresponding connector 96 on the partition 50 can engage the connector on the abutment end 90 of the retaining cover when the retaining cover is in the closed position.

Retaining covers can be formed from any suitable material, such as cloth, plastic, etc.

As discussed above, the floor 34 includes the middle portion 38 between the front and the rear portions 36, 40. The partition 50 is supported on the floor 34 between the front and middle portions 36, 38, and in the vehicle-forward direction relative to the middle portion 38.

One or more seats can be disposed on the middle portion 38. As shown in FIGS. 2A-4B, the first middle seat 76 and the second middle seat 78 can be disposed on the middle portion 38 of the floor 34. The first and second middle seats 76, 78 can be spaced from each other. For example, the first middle seat 76 can be disposed on the middle portion 38 of the floor 34 on one side of the centerline C, and the second middle seat 78 can be disposed on the middle portion 38 of the floor 34 on an opposing side of the centerline C.

The first and second middle seats 76, 78 can include seat bottoms and seatbacks. The seat bottoms of the first and second middle seats 76, 78 can each be supported by a base (not shown) on the middle portion 38 of the floor 34. The base can be configured to maintain the first and second middle seats 76, 78 in fixed positions, e.g., facing the vehicle-forward direction or facing the vehicle-rearward direction.

Alternatively, the bases and the seat bottoms of the first and second middle seats 76, 78 can be slidably connected, e.g., with slidable rails. In this way, the first and second middle seats 76, 78 can slidably move in the vehicle fore-aft direction, i.e., between a rearward position and a forward position on the middle portion 38 of the floor 34.

The bases and the seat bottoms of the first and second middle seats 76, 78 can be further configured to allow the first and second middle seats 76, 78 to rotate relative to the floor 34. For example, the seat bottoms can be rotatably attached to the bases. When rotated, the bases can be configured to allow the first and second middle seats 76, 78 to be fixed at any location throughout a rotation relative to an initial location, e.g., at 45 degrees relative to the initial location, etc.

As discussed above and shown in FIGS. 2A-4B, the one or more middle seats (such as the first and second middle seats 76, 78) can be disposed on the middle portion 38 of the floor 34 at locations such that the one or more airbags housings (such as the first and second airbag housings 58, 60) supported by the partition 50 are aligned with the one or more middle seats in the cross-vehicle direction. Thus, in an impact event, such as a frontal impact, each airbag (such as the first and second airbags 60, 64) associated with each of the one or more airbag housings can inflate to the inflated position, and assist in absorbing impact energy from occupants of the one or more middle seats.

The floor 34 of the vehicle 10 includes the rear portion 40 located in the vehicle-rearward direction relative to the middle portion 38.

One or more seats can be disposed on the rear portion 40 of the floor 34. As shown in FIGS. 2A-4B, a rear seat 80 is disposed on the rear portion 40 of the floor 34 across the centerline C of the vehicle 10. The rear seat 80 can include a seat bottom and a seatback. A base (not shown) can support the seat bottom of the rear seat 80 on the rear portion 40 of the floor 34. The base can be configured to maintain the rear seat 80 in a fixed position, e.g., facing the vehicle-forward direction or facing the vehicle-rearward direction.

Alternatively, the base and the seat bottom of the rear seat 80 can be slidably connected, e.g., with slidable rails. In this way, the rear seat 80 can slidably move in the vehicle fore-aft direction, i.e., between a rearward position and a forward position on the rear portion 40 of the floor 34.

The base and the seat bottom of the rear seat 80 can be further configured to allow the rear seat 80 to rotate relative to the floor 34. For example, the seat bottom can be rotatably attached to the base. When rotated, the base can be configured to allow the rear seat 80 to be fixed at any location throughout a rotation relative to an initial location, e.g., at 45 degrees relative to the initial location, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The adjectives "first" and "second" are used herein as identifiers and are not intended to indicate an order or importance of the elements.

What is claimed is:

1. A vehicle comprising:
   a floor having a front portion, a rear portion, and a middle portion between the front and rear portions;
   a partition supported on the floor between the front and middle portions and extending in a cross-vehicle direction;
   the partition supporting a first airbag housing having a first airbag inflatable to an inflated position;
   the first airbag extending in a vehicle-rearward direction in the inflated position; and
   a retaining cover moveable between an open position and a closed position, the retaining cover covering at least a portion of the front portion of the floor in the closed position.

2. The vehicle of claim 1, wherein the partition extends from the floor in a generally perpendicular direction relative to the floor.

3. The vehicle of claim 1, wherein the front portion is between an instrument panel and the partition.

4. The vehicle of claim 1, wherein the front portion is devoid of seats.

5. The vehicle of claim 4, wherein at least a portion of the front portion of the floor is recessed relative to the middle portion of the floor.

6. The vehicle of claim 1, wherein the partition supports a second airbag housing having a second airbag inflatable to an inflated position, the second airbag housing spaced from the first airbag housing in the cross-vehicle direction.

7. The vehicle of claim 1, further comprising a front seat disposed on the front portion of the floor and facing the vehicle-rearward direction, a first space on the front portion of the floor extending between a first side of the front seat and a left end of the floor, and a second space on the front portion of the floor extending between a second side of the front seat and a right end of the floor.

8. The vehicle of claim 7, wherein at least one of the first and second spaces is recessed relative to the middle portion of the floor.

9. The vehicle of claim 7, further comprising a second retaining cover, each of the retaining cover and the second retaining cover being moveable between an open position and a closed position, the retaining cover covering at least a portion of the first space in the closed position, the second retaining cover covering at least a portion of the second space in the closed position.

10. The vehicle of claim 7, wherein the partition defines an opening aligned with the front seat in the cross-vehicle direction.

11. The vehicle of claim 10, wherein in the inflated position, the first airbag covers at least a portion of the opening.

12. The vehicle of claim 10, wherein the partition supports a second airbag housing having a second airbag inflatable to an inflated position, the first airbag housing supported by the partition on a first side of the opening and the second airbag housing supported by the partition on a second side of the opening.

13. The vehicle of claim 12, wherein the second airbag covers at least a portion of the opening in the inflated position.

14. The vehicle of claim 1 further comprising a first middle seat disposed on the middle portion of the floor.

15. The vehicle of claim 14, further comprising a second middle seat disposed on the middle portion of the floor and spaced from the first middle seat.

16. The vehicle of claim 1, further comprising a rear seat disposed on the rear portion of the floor.

17. The vehicle of claim 1, further comprising a vehicle body having a left side and a right side, the vehicle body including a first door on the left side and a second door on the right side.

18. The vehicle of claim 17, wherein the first and second doors are slidably mounted to the vehicle body.

19. A vehicle comprising:
   a floor having a front portion, a rear portion, and a middle portion between the front and rear portions;
   a partition supported on the floor between the front and middle portions and extending in a cross-vehicle direction;
   the partition supporting a first airbag housing having a first airbag inflatable to an inflated position;
   the first airbag extending in a vehicle-rearward direction in the inflated position; and
   a front seat disposed on the front portion of the floor and facing the vehicle-rearward direction, a first space on the front portion of the floor extending between a first side of the front seat and a left end of the floor, and a second space on the front portion of the floor extending between a second side of the front seat and a right end of the floor;

wherein the partition defines an opening aligned with the front seat in the cross-vehicle direction.

20. The vehicle of claim 19, wherein in the inflated position, the first airbag covers at least a portion of the opening.

* * * * *